United States Patent [19]

Shamoto

[11] Patent Number: 5,194,794
[45] Date of Patent: Mar. 16, 1993

[54] ELECTRIC CONTROL APPARATUS FOR BRUSHLESS MOTOR

[75] Inventor: Sumikazu Shamoto, Toyota, Japan

[73] Assignee: Toyota Jidosha Kabushiki Kaisha, Toyota, Japan

[21] Appl. No.: 819,292

[22] Filed: Jan. 10, 1992

[30] Foreign Application Priority Data

Jan. 11, 1991 [JP] Japan .................................. 3-13752

[51] Int. Cl.⁵ ............................................ H02P 6/02
[52] U.S. Cl. ........................................ 318/603; 318/434; 318/432; 318/138; 318/254; 364/424.05; 180/142; 180/79.1
[58] Field of Search ............................ 318/430-434, 318/603, 138, 254, 439; 180/79.1, 143; 364/424.05, 424.02

[56] References Cited

U.S. PATENT DOCUMENTS

| | | | |
|---|---|---|---|
| 4,939,435 | 7/1990 | Takahashi et al. | 318/432 |
| 4,979,114 | 12/1990 | Oshita et al. | 364/424.05 |
| 5,018,594 | 5/1991 | Takahashi et al. | 364/424.05 |
| 5,040,629 | 8/1991 | Matsuoka et al. | 364/424.05 |
| 5,053,966 | 10/1991 | Takahashi et al. | 364/424.05 |
| 5,065,325 | 11/1991 | Takahashi | 364/424.05 |
| 5,086,859 | 2/1992 | Takahashi et al. | 318/434 |

Primary Examiner—Paul Ip
Attorney, Agent, or Firm—Cushman, Darby & Cushman

[57] ABSTRACT

A control apparatus for controlling an output torque of a brushless electric motor based on a torque command signal received from a torque command signal generator. The control apparatus includes magnetic pole position sensors for producing position signals indicative of a rotational position of a rotor of the motor. A counter outputs an address signal based on the position signals. A sine wave memory, which stores plural sine waves, outputs a sine wave signal based on the address signal. Then the amplitude of the sine wave signal is linearly controlled based on the torque command signal, and stator current is applied to stator windings of the motor based on the linearly controlled sine wave signal.

9 Claims, 4 Drawing Sheets

ELECTRIC CONTROL APPARATUS FOR BRUSHLESS MOTOR

BACKGROUND OF THE INVENTION

1. Field of the Invention

The present invention relates to a brushless electric motor, more particularly to an electric control apparatus in combination with a torque command signal generator for controlling an output torque of the brushless electric motor in accordance with a torque command signal from the signal generator.

2. Description of the Prior Art

In Japanese Patent Laid-open Publication No. 64-64583, there is disclosed an electric control apparatus which includes an encoder for detecting a rotational speed of the rotor of a motor. In the control apparatus, an address signal is formed in accordance with the rotational speed of the rotor, and a sine wave signal is read out from a sine-wave memory at a frequency proportional to the rotor speed. The amplitude of the sine wave signal is linearly controlled, in response to a torque command signal from an associated signal generator, to apply a motor current to the stator windings of the motor for controlling the rotation of the motor. In general, the encoder is composed of light emitting and receiving elements opposed to one another through a rotary disc with a slit, a driving circuit for activating the light emitting element, and a receiving circuit for receiving a signal detected by the light receiving element. The driving circuit and the receiving circuit, however, become unstable when operating under high temperature conditions. For this reason, the conventional electric control apparatus for the brushless electric motor may not be used in a high temperature enviroment.

SUMMARY OF THE INVENTION

It is, therefore, a primary object of the present invention to provide an improved electric control apparatus for the brushless electric motor which can be used without any trouble even in a high temperature enviroment.

The primary object of the present invention is accomplished by providing an electric control apparatus for a brushless electric motor in combination with a torque command signal generator. The electric control apparatus controls an output torque of the motor in accordance with a torque command signal from the signal generator. The control apparatus comprises magnetic pole position detecting means for detecting a rotational position of a rotor of the motor and for producing a magnetic pole signal indicative of the rotational position of the rotor, rotational speed detecting means for detecting a rotational speed of the rotor in dependence upon the magnetic pole signal, counter means the count value of which changes in accordance with the rotational speed of the rotor, for producing an address signal defined by change of the count value, sine-wave memory means for memorizing a wave form data forming a sine-wave in such a manner that the the memorized wave data is read out under control of the address signal for producing a sine-wave signal at a frequency proportional to the rotational speed of the rotor, control means for linearly controlling the amplitude of the sine-wave signal in accordance with the torque command signal from the torque command signal generator, and a current control circuit for applying a motor current to a stator winding of the motor in accordance with the linearly controlled sine-wave signal.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
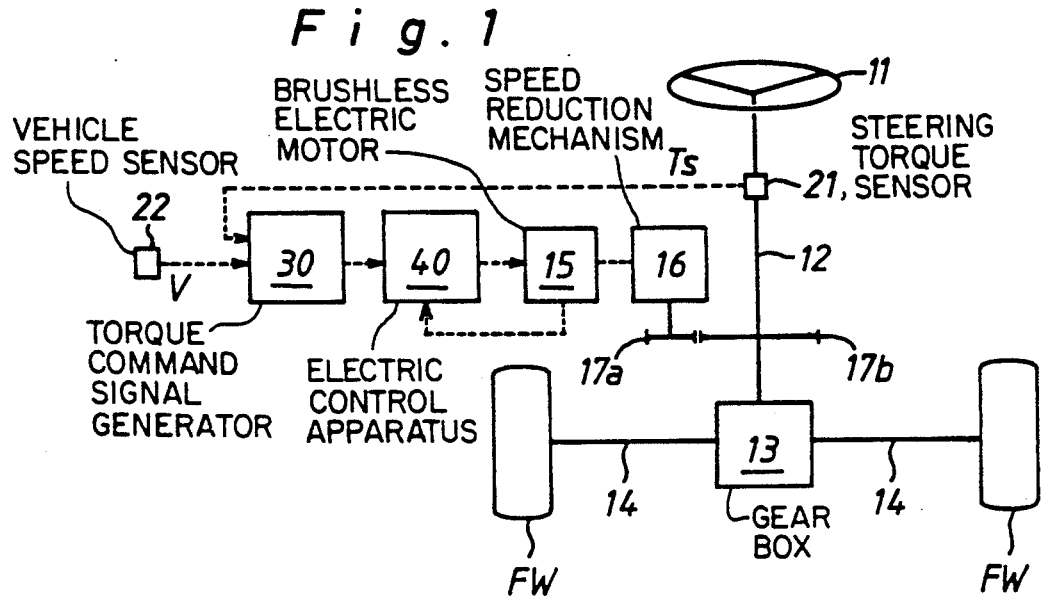
FIG. 1 is a schematic illustration of a preferred embodiment of the present invention adapted to a power-assisted steering mechanism of a motor vehicle.

Referring now to the drawings, FIG. 1 illustrates an electric control apparatus 40 for a brushless electric motor 15 in a power-assisted steering mechanism of a motor vehicle. In the steering mechanism, a steering wheel 11 is operatively connected to a set of dirigible front road wheels FW, FW by way of a steering shaft 12, a gear box 13 and a pair of tie rods 14, 14. The steering shaft 12 is arranged to be applied at its intermediate portion with a driving torque from the brushless motor 15 through a speed reduction mechanism 16 and intermeshed gears 17a, 17b. The brushless electric motor 15 is in the form of a permanent magnetic motor of the three-phase synchronous type which includes a permanent magnet rotor 15a and three-phase stator windings 15b, 15c, 15d, as shown in FIGS. 2 and 3.

Figure 7:
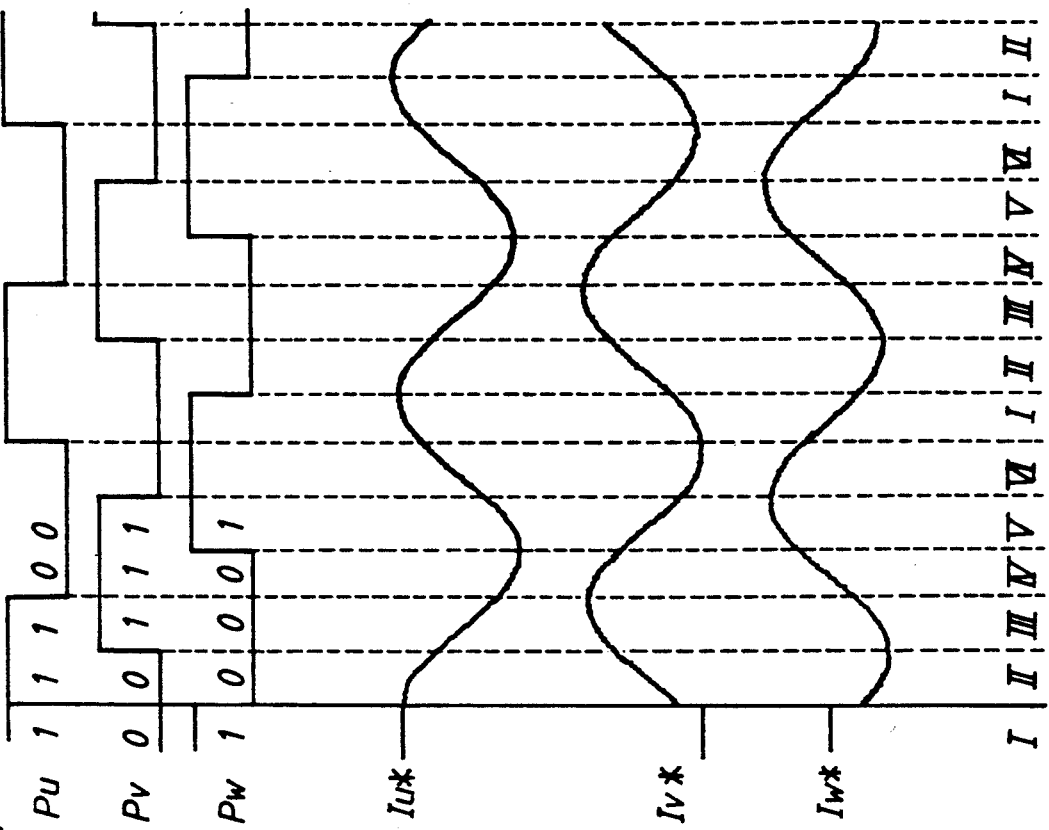
FIG. 7 illustrates wave forms of magnetic pole signals Pu, Pv, Pw and three-phase current command signals Iu*, Iv*, Iw* utilized after start of the brushless electric motor.
Figure 6:
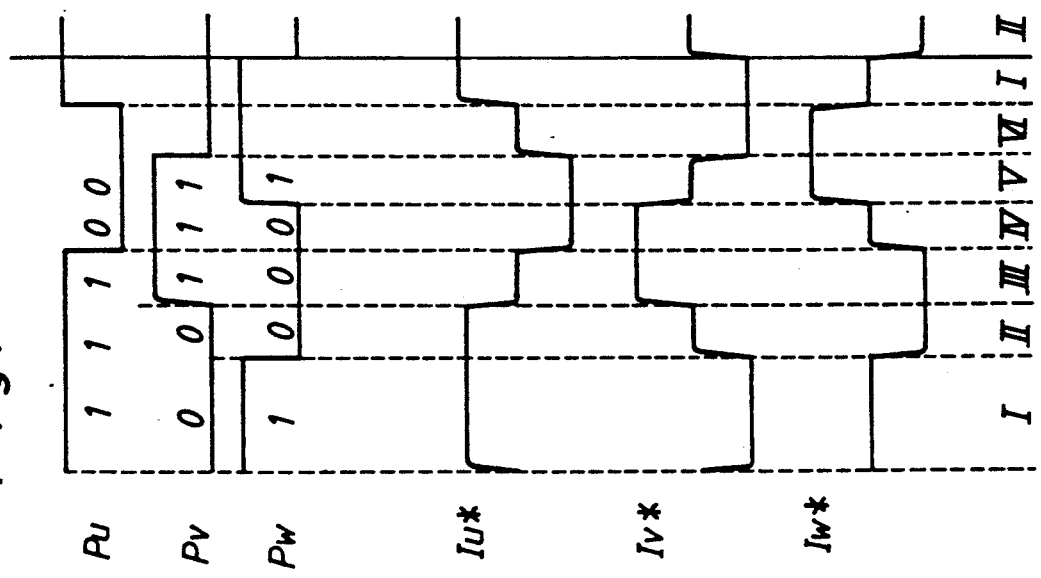
FIG. 6 illustrates wave forms of magnetic pole signals Pu, Pv, Pw and three-phase current command signals Iu*, Iv*, Iw* utilized for start of the brushless electric motor.

As shown in FIG. 1, the steering shaft 12 is provided thereon with a steering torque sensor 21 in the form of a strain gauge which is arranged to detect a steering torque $T_s$ acting on the steering shaft 12. A torque command signal generator 30 is connected to the torque sensor 21 to input an electric signal indicative of the steering torque $T_s$. Torque command signal generator 30 is further connected to a vehicle speed sensor 22 to input an electric signal indicative of the vehicle speed V. As shown FIGS. 2 and 3, the brushless motor 15 has magnetic pole position sensors 23a, 23b and 23c, which are in the form of hall effect devices, positioned to correspond with the stator windings 15b, 15c and 15d. The position sensors 23a–23c are arranged to detect a rotational position of the rotor 15a, and produce magnetic pole signals Pu, Pv, Pw respectively, indicative of the rotational position of rotor 15a with a resolution power of $\pi/3$. As shown in FIGS. 6 and 7, the position sensor 23a produces the magnetic pole signal Pu at a high level when the north pole of rotor 15a is positioned in regions I, II, and III in FIG. 3 and at a low level when the north pole of rotor 15a is positioned in regions IV, V, and VI in FIG. 3. The position sensor 23b produces the magnetic pole signal Pv at a high level when the north pole of rotor 15a is positioned in the regions III, IV, V in FIG. 3 and at a low level when the north pole of rotor 15a is positioned in the regions VI, I, II in FIG. 3. The position sensor 23c produces the magnetic pole signal Pw at a high level when the north pole of rotor 15a is positioned in the regions V, VI, and I in FIG. 3 and at a low level when the north pole of rotor 15a is positioned in the regions II, III, and IV in FIG. 3.

Figure 4:
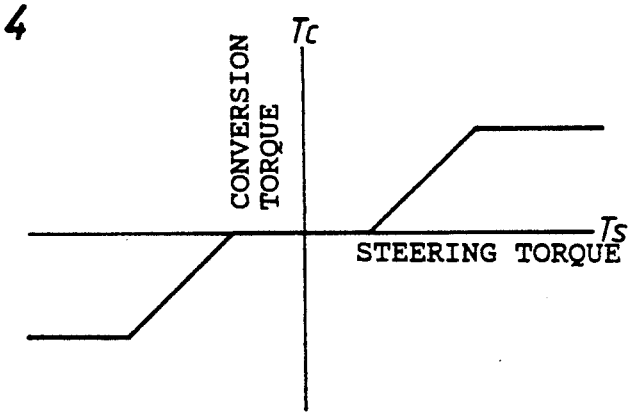
FIG. 4 is a graph showing a conversion torque $T_c$ in relation to a steering torque $T_s$.
Figure 5:
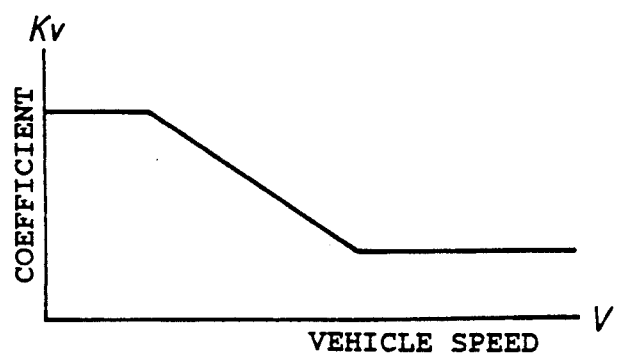
FIG. 5 is a graph showing a coefficient $K_v$ in relation to a vehicle speed V.

The torque command signal generator 30 includes a conversion table for converting the steering torque $T_s$ into a conversion torque $T_c$ as shown in FIG. 4, a coefficient table for determining a coefficient $K_v$ in accordance with the vehicle speed V as shown in FIG. 5, and a multiplier for multiplying the conversion torque $T_c$ by the coefficient $K_v$ to calculate an assist torque $T_A$. When applied with the electric signals respectively indicative of the steering torque $T_s$ and the vehicle speed V, the signal generator 30 produces a digital torque command signal indicative of the assist torque $T_A (=K_v T_c)$.

Figure 2:
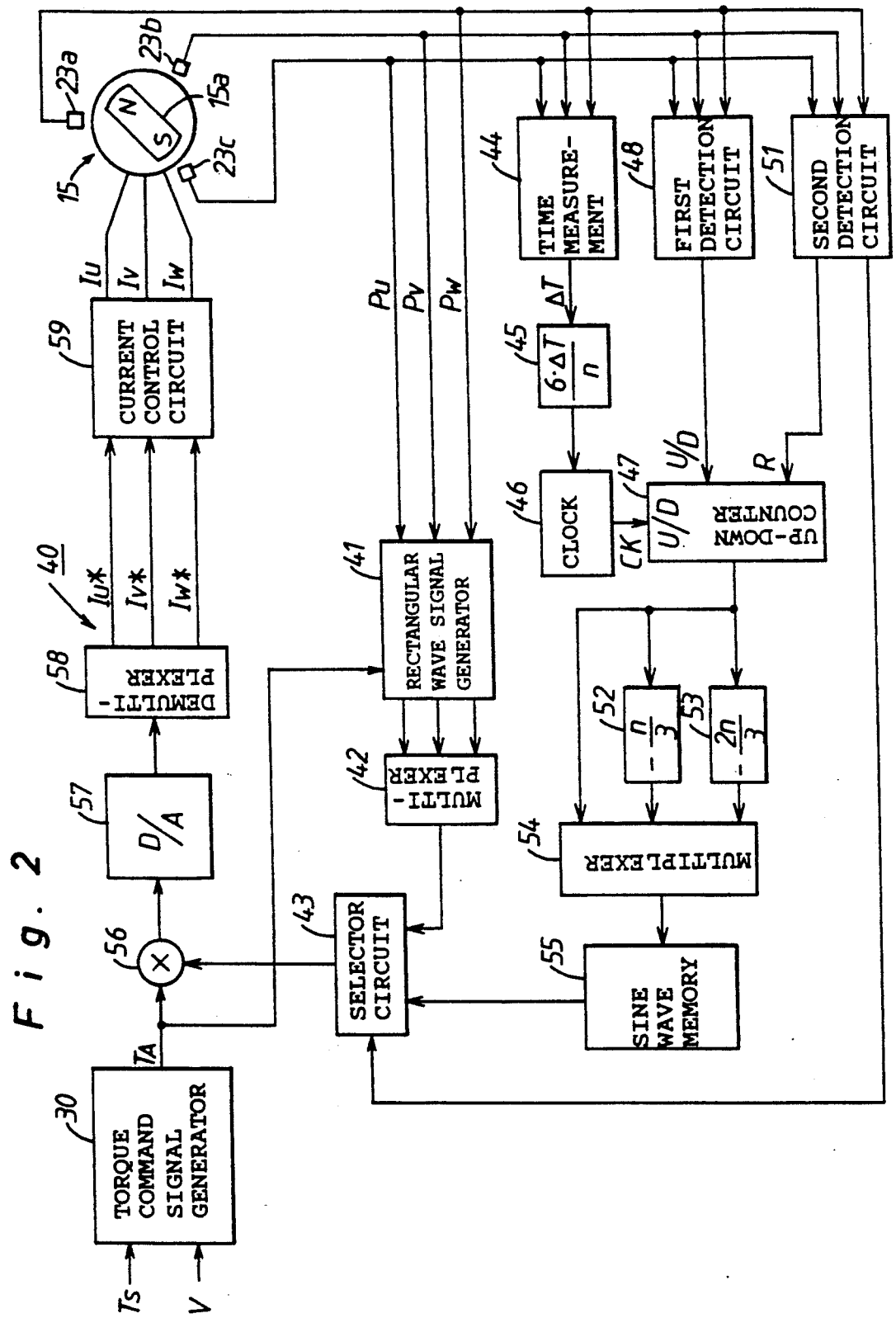
FIG. 2 is a block diagram of an electric control apparatus in combination with a torque command signal generator for control of a brushless electric motor in the steering mechanism shown in FIG. 1.
Figure 3:
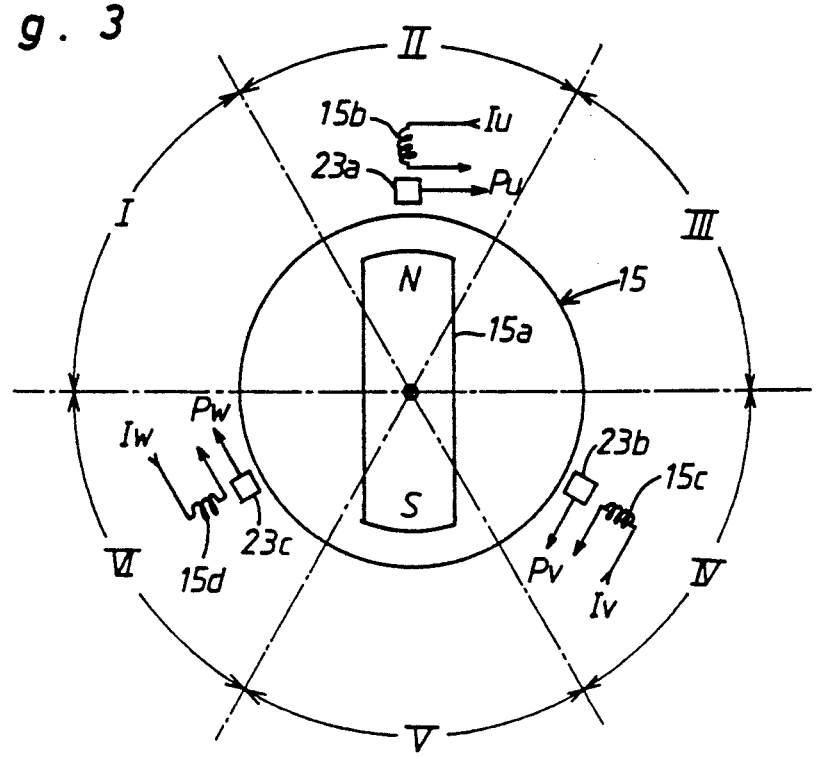
FIG. 3 illustrates magnetic pole position sensors positioned to correspond with the stator windings of the brushless electric motor.

As shown in FIG. 2, the electric control apparatus 40 includes a rectangular wave signal generator 41 arranged to be applied with the magnetic pole signals Pu, Pv, Pw from position sensors 23a–23c. When applied with the magnetic pole signals Pu, Pv, Pw, the rectangular wave signal generator 41 produces three-phase rectangular wave signals Iu*, Iv*, Iw* of the digital type in accordance with each level of the magnetic pole signals Pu, Pv, Pw as shown in FIG. 6. The rectangular wave signals Iu*, Iv*, Iw* are offset at a phase of $2\pi/3$ and produced as a positive or negative signal. The rectangular wave signal generator 41 is further arranged to be applied with an instruction signal for instructing a direction of the assist torque $T_A$ from the torque command signal generator 30. The instruction signal is adapted to determined a rotational direction of the motor at its start. A multiplexer circuit 42 is connected to the rectangular wave signal generator 41 to time divisionally multiplex the three-phase rectangular wave signals applied thereto and to apply the multiplexed signals to a selector circuit 43. The electric control apparatus 40 further includes a time measurement circuit 44 which is arranged to measure a period of time $\Delta T$ during which the combination of the magnetic pole signals Pu, Pv, Pw changes from one pattern to the other pattern and to produce an electric signal indicative of the measured period of time $\Delta T$. In this instance, the period of time $\Delta T$ is measured as a period of time required to rotate the rotor 15a by $\pi/3$.

As shown in FIG. 2, the time measurement circuit 44 is connected to an operational amplifier 45 which is arranged to calculate a time period of $6 \cdot \Delta T/n$ on a basis of the measured period of time $\Delta T$ and to produce an electric signal indicative of the calculated time period $6 \cdot \Delta T/n$. In this embodiment, the value n represents the number of wave form data memorized in a sine-wave memory 55, namely the number of sampling data indicative of each instantenous value of sine waves. The time period $6 \cdot \Delta T/n$ represents a time interval for reading out the respective wave form data. The operational amplifier 45 is connected to a clock signal generator 46 which is applied with an electric signal indicative of the time period $6 \cdot \Delta T/n$ for producing a clock signal at a time interval defined by the time period $6 \cdot \Delta T/n$. An up-and-down counter 47 has a first input terminal CK connected to the clock signal generator 46 to produce a count value in response to the clock signal applied thereto. The count value changes from 0 to n−1. The up-and-down counter 47 has a second input terminal U/D for up-down control and a reset terminal R. The up-and-down counter 47 operates to count up the count value when applied with a signal of "1" at its input terminal U/D and to count down the count value when applied with a signal of "0" at its input terminal U/D. The up-and-down counter 47 is reset to set an initial value "0" when applied with a reset signal at its reset terminal R.

The up-and-down counter 47 is connected at its input terminal U/D to a first detection circuit 48 for detecting a rotational direction of the rotor 15a and at its reset terminal R to a second detection circuit 51 for detecting one rotation of the rotor 15a. The first detection circuit 48 is designed to detect the rotational direction of rotor 15a in accordance with change of the combination pattern of magnetic pole signals Pu, Pv, Pw. When the magnetic pole signals Pu, Pv, Pw have changed from "1, 0, 0" in the region II to "1, 1, 0" in the region III as shown in FIGS. 6 and 7 or changed from "1, 1, 0" in the region III to "0, 1, 0" in the region IV as shown in FIGS. 6 and 7, the first detection circuit 48 detects the forward rotation of rotor 15a. When the magnetic pole signals Pu, Pv, Pw have changed from "1, 1, 0" in the region III to "1, 0, 0" in the region II as shown in FIGS. 6 and 7 or changed from "0, 1, 0" in the region IV to "1, 1, 0" in the region III as shown in FIGS. 6 and 7, the first detection circuit 48 detects the reverse rotation of rotor 15a. thus, the first detection circuit 48 produces an output signal of "1" when the forward rotation of rotor 15a, is detected, and produces an output signal of "0" when the reverse rotation of rotor 15a is detected. The second detection circuit 51 is designed to detect the rotation of rotor 15a at start of the motor 15 in dependence upon change of the combination pattern of magnetic pole signals Pu, Pv, Pw, and to produce a reset signal therefrom when the magnet pole signal Pu, Pv, Pw have changed from "1, 0, 1" to "1, 0, 0" or from "1, 0, 0" to "1, 0, 1" after start of the motor 15. Thus, the second detection circuit 51 applies an output signal of "0" to the selector 43 before and after start of the motor 15 and applies an output signal of "1" to the selector 43 after the reset signal is produced.

The output line of up-and-down counter 47 is directly connected to a multiplexer 54, and connected through subtractors 52, 53 to the multiplexer 54. The subtractor 52 is arranged to subtract a value of n/3 from an output value of counter 47, while the subtractor 53 is arranged to subtract a value of 2n/3 from the output value of counter 47. The multiplexer 54 is arranged to effect time-division multiplex of input signals from the counter 47 and subtractors 52, 53 and to supply the multiplexed input signals to the sine-wave memory 55. In this embodiment, the sine-wave memory 55 is designed to successively memorize a certain number of sampling data, each indicative of an instantaneous value defined by an equally divided value of a sine-wave period $(0-2\pi)$. The sampling data are memorized as a wave form data in the sine-wave memory 55 at positions designated by address values 0 to n−1. In this instance, a maximum value $(\sin \pi/2)$ of the sampling data is memorized in a position designated by an address value of "0". The memorized wave form data are applied to another input terminal of selector circuit 43 under control of an input signal from the second detection circuit 51. The selector circuit 43 acts to select the rectangular wave form signal from multiplexer 42 when applied with an input signal of "0" from the second detection circuit 51 and to select the sine-wave signal (the wave form data) from the sine-wave memory 55 when applied with an input signal of "1" from the second detection circuit 51.

A multiplier 56 is connected to the selector circuit 43 to control the amplitude of the output signal from selector circuit 43 in accordance with the assist torque $T_A$ determined by the torque command signal generator 30. The multiplier 56 acts to multiply the output signal value of selector circuit 43 by the assist torque $T_A$ and to issue a digital signal representing the multiplied value. The multiplier 56 is connected to a demultiplexer 58 through a digital-to-analog converter 57. The demultiplexer 58 is provided to release the time-division multiplicity of the input analog signal for issuing three-phase current common signals Iu*, Iv*, Iw* therefrom. The demultiplexer 58 is connected to a current control circuit 59 which is in the form of a PWM inverter circuit including a triangular wave generator, a comparison circuit and an inverter circuit. The current control circuit 59 is responsive to the three-phase current command signals Iu*, Iv*, Iw* to apply three-phase motor currents Iu, Iv, Iw to the stator windings 15b, 15c, 15d of motor 15, respectively.

Hereinafter, the operation of the above embodiment will be described in detail. Assuming that the steering wheel 11 has been rotated rightward or leftward, the front road wheels FW, FW are steered by the steering effort applied thereto through the steering shaft 12, gear box 13 and tie rods 14, 14. In this instance, the steering torque sensor 21 detects a steering torque $T_s$ acting on the steering shaft 12 and applies an electric signal indicative of the steering torque $T_s$ to the torque command signal generator 30. Simultaneously, the vehicle speed sensor 22 detects a travel speed V of the vehicle and applies an electric signal indicative of the vehicle speed V to the torque comman signal generator 30. Thus, the torque command signal generator 30 calculates an assist torque $T_A (= K_v \cdot T_c)$ based on the steering torque $T_s$ and vehicle speed V and applies a torque command signal indicative of the calculated assist torque $T_A$ to the multiplier 56.

In such operation, the selector circuit 43 is applied with an input signal of "0" from the second detection circuit 51 to select the time-divisionally multiplexed three-phase rectangular wave signals applied thereto from the rectangular wave signal generator 41 through the multiplexer 42. Thus, the multiplier 56 linearly controls the amplitude of the three-phase rectangular wave signals in accordance with the assist torque $T_A$ and applies the linearly controlled rectangular wave signals to the digital-to-analog converter 57. The linearly controlled rectangular wave signals each are converted by converter 57 into an analog signal. In turn, the time-divisional multiplicity of the analog signals is released by demultiplexer 58 to issue three-phase current command signals Iu*, Iv*, Iw*. When applied with the three-phase current command signals Iu*, Iv*, Iw*, the current control circuit 59 produces motor currents Iu, Iv, Iw corresponding with the current command signals Iu*, Iv*, Iw* and applies them to the stator windings 15b, 15c, 15d of motor 15. In this instance, the rectangular wave signal generator 41 produces three-phase rectagular wave signals in response to the magnetic pole signals Pu, Pv, Pw applied thereto from the magnetic pole position sensors 23a, 23b and 23c. This causes a rotating magnetic field corresponding with the rotational position of rotor 15a in the brushless electric motor 15. Thus, the rotor 15a starts to rotate under the rotating magnetic field, and the progress direction of the three-phase rectangular wave signals is determined by the instruction signal from the torque command signal generator 30.

When the rotational position of rotor 15a changes from the region I to II (or from the region II to I) during one rotation of the rotor 15a, the second detection circuit 51 applies a reset signal to the reset input terminal R of up-and-down counter 47 in response to rotation of the rotor 15 passing through a boundary between the two regions I and II. Thus, the count value of up-and-down counter 47 is set as an initial value "0". In this instance, the time measurement circuit 44 is applied with the magnetic pole signals Pu, Pv, Pw from position sensors 23a, 23b, 23c to continue measurement of a period of time $\Delta T$ during which the rotor 15a rotates by $\pi/3$. Meanwhile, the operational amplifier 45 executes the calculation of $6 \cdot \Delta T/n$ based on the period of time $\Delta T$ to issue an output signal indicative of a time interval for reading out the respective wave form data from the sine-wave memory 55. The clock signal generator 46 applies a clock signal to the up-and-down counter 47 at the time interval defined by the output signal from operational amplifier 45. Thus, the count value of up-and-down counter 47 changes by "1" from the initial value "0" in a positive or negative direction in response to the clock signal. In addition, the counting operation in the positive or negative direction is controlled by a signal of "1" or "0" from the first detection circuit 48.

An output signal indicative of the count value of up-and-down counter 47 is directly applied to the multiplexer 54 and is also applied to the multiplexer 54 after being subtracted by n/3, 2n/3 respectively at the substractors 52 and 53. Thus, the multiplexer 54 time-divisionally multiplexes the three signals and applies the mutiliplexed signals to the sine-wave memory 55 as an address signal. When applied with the address signal, the sine-wave memory 55 causes the selector circuit 43 to read out a sine-wave signal of the digital type time-divisionally multiplexed by $2\pi/3$ for corresponding with the rotating position, speed and direction of rotor 15a. After issuance of the reset signal, the second detection circuit 51 applies an output signal of "1" to the selector circuit 43. When applied with the output signal of "1", the selector circuit 43 acts to apply the sine-wave signal to the multiplier 56.

The sine-wave signal applied to multiplier 56 is linearly controlled in the same manner as described above in accordance with the assist torque $T_A$ applied from the torque command signal generator 30 and is converted into an analog signal by means of the digital-to-analog converter 57. Since the time-divisional multiplicity of the analog signal is released by the demultiplexer 58, the current control circuit 59 is applied with such three-phase current command signals Iu*, Iv*, Iw* as shown in FIG. 7. When applied with the three-phase current command signals Iu*, Iv*, Iw*, the current control circuit 59 applies motor currents Iu, Iv, Iw to the stator windings 15b, 15c, 15d. This causes a rotating magnetic field corresponding with the rotating position, speed and direction of rotor 15a in the brushless motor 15. The magnitude of the rotating magnetic field is controlled to be proportional to the assist torque $T_A$. Since the rotating magnetic field does not include any harmonic content, the rotor 15a smoothly rotates in synchronism with the rotating magnetic field, and the driving torque of motor 15 is controlled to be proportional to the assist torque $T_A$. The driving torque of motor 15 is applied to the steering shaft 12 through the speed reduction mechanism 16 and intermeshed gears 17a, 17b to assist the steerage of the front road wheels FW, FW.

With the electric control apparatus 40 described above, the rotation of brushless motor 15 can be detected by the output signals of magnetic pole position sensors 23a, 23b, 23c without using the conventional encoder, and the driving torque of brushless motor 15 can be controlled by the torque command signal. Accordingly, the rotation of brushless motor 15 can be smoothly controlled without any trouble even under a high temperature environment.

Although in the above embodiment the present invention has been adapted to a power-assisted steering mechanism of a motor vehicle, it will be obvious to those skilled in the art that the invention may be adapted to control a brushless motor assembled with industrial robots, machine tools and the like.

What is claimed is:

1. A control apparatus for controlling an output torque of a brushless electric motor based on a torque command signal received from a torque command signal generator, said control apparatus comprising:
    magnetic pole position detecting means for producing position signals indicative of a rotational position of a rotor of said motor;
    address output means for outputting an address signal based on said position signals;
    sine wave memory means for storing plural sine waves and for outputting a sine wave signal based on said address signal;
    control means for linearly controlling an amplitude of said sine wave signal based on said torque command signal;
    current control means for applying stator current to stator windings of said motor based on said linearly controlled sine wave signal.

2. The control apparatus of claim 1, wherein said magnetic pole position detecting means comprises a magnetic pole positioning sensor corresponding to each stator winding of said motor.

3. The control apparatus of claim 1, further comprising:
    a rotational speed determining means for determining a rotational speed of said rotor based on said position signals; and wherein
    said address outputting means outputs said address signal based on said rotational speed.

4. The control apparatus of claim 3, wherein said address outputting means is a counter having a count value which defines said address signal, said count value changing in accordance with said rotational speed.

5. The control apparatus of claim 4, further comprising:
    a direction determining means for determining a forward or reverse rotating direction of said rotor based on said position signals; and
    a start determining means for determining a start of said motor based on said position signals; and wherein
    said counter increases said count value when said direction determining means indicates forward rotation, decreases said count value when said direction determining means indicates reverse rotation, and resets said count value when said start determining means indicates a start of said motor.

6. The control apparatus of claim 3, wherein a frequency of said sine wave signal is proportional to said rotational speed.

7. The control apparatus of claim 1, further comprising:
    a rectangular wave signal generating means for generating a rectangular wave signal based on said position signals;
    a start determining means for determining a start of said motor based on said position signals; and
    selecting means for producing as a selected signal one of said rectangular wave signal and said sine wave signal, said selected signal being said rectangular wave signal when said start determining means does not indicate that said motor has started, and said selected signal being said sine wave signal when said determining means indicates that said motor has started; wherein
    said control means linearly controls an amplitude of said selected signal based on said torque command signal; and
    said current control means applies stator current to stator windings of said motor based on said linearly controlled selected signal.

8. The control apparatus of claim 7, wherein said rectangular wave signal generating means generates a rectangular wave signal to rotate said rotor in one of a forward and reverse direction based on said torque command signal.

9. A power assisted steering mechanism for a vehicle having a steering wheel, a shaft connected to said steering wheel, a gear box connected to said shaft, and tie rods connected to said gear box and front wheels of said vehicle, said steering mechanism comprising:
    a brushless electric motor operationally connected to said shaft for assisting in a rotation of said shaft;
    a torque sensor for detecting a steering torque acting on said shaft;
    a torque command signal generator for producing a torque command signal based on said detected steering torque; and
    a control apparatus for controlling an output torque of said brushless electric motor based on said torque command signal, said control apparatus including,
        magnetic pole position detecting means for producing position signals indicative of a rotational position of a rotor of said motor;
        address output means for outputting an address signal based on said position signals;
        sine wave memory means for storing plural sine waves and for outputting a sine wave signal based on said address signal;
        control means for linearly controlling an amplitude of said sine wave signal based on said torque command signal;
        current control means for applying stator current to stator windings of said motor based on said linearly controlled sine wave signal.

* * * * *